United States Patent [19]

Lanphier, III et al.

[11] 4,262,288
[45] Apr. 14, 1981

[54] ELECTRONIC DISABLING SWITCH

[75] Inventors: Robert C. Lanphier, III, Springfield; James H. Anson, Auburn; Harold O. McCarty, Springfield; David E. Steffen, Chatham, all of Ill.

[73] Assignee: Dickey-john Corporation, Auburn, Ill.L

[21] Appl. No.: 455,222

[22] Filed: Mar. 27, 1974

[51] Int. Cl.³ .............................. G08B 21/00
[52] U.S. Cl. .................... 340/674; 340/521; 340/529; 340/671; 340/684
[58] Field of Search ........... 340/248 C, 259, 267 R, 340/271, 420, 518, 521, 522, 671, 674, 684

[56] References Cited
U.S. PATENT DOCUMENTS
3,789,384 1/1974 Akers .................. 340/420 X Primary Examiner—David L. Trafton
Attorney, Agent, or Firm—Trexler, Wolters, Bushnell & Fosse

[57] ABSTRACT

There is disclosed a monitoring system for monitoring a plurality of functions or stations in a machine and capable of providing an alarm signal in the event of a failure or significant deviation in any one of the functions, which monitoring system also incorporates electronic circuitry for automatically temporarily disabling the alarm device in the event of a near simultaneous discontinuance or deviation in all of the functions being monitored.

5 Claims, 1 Drawing Figure

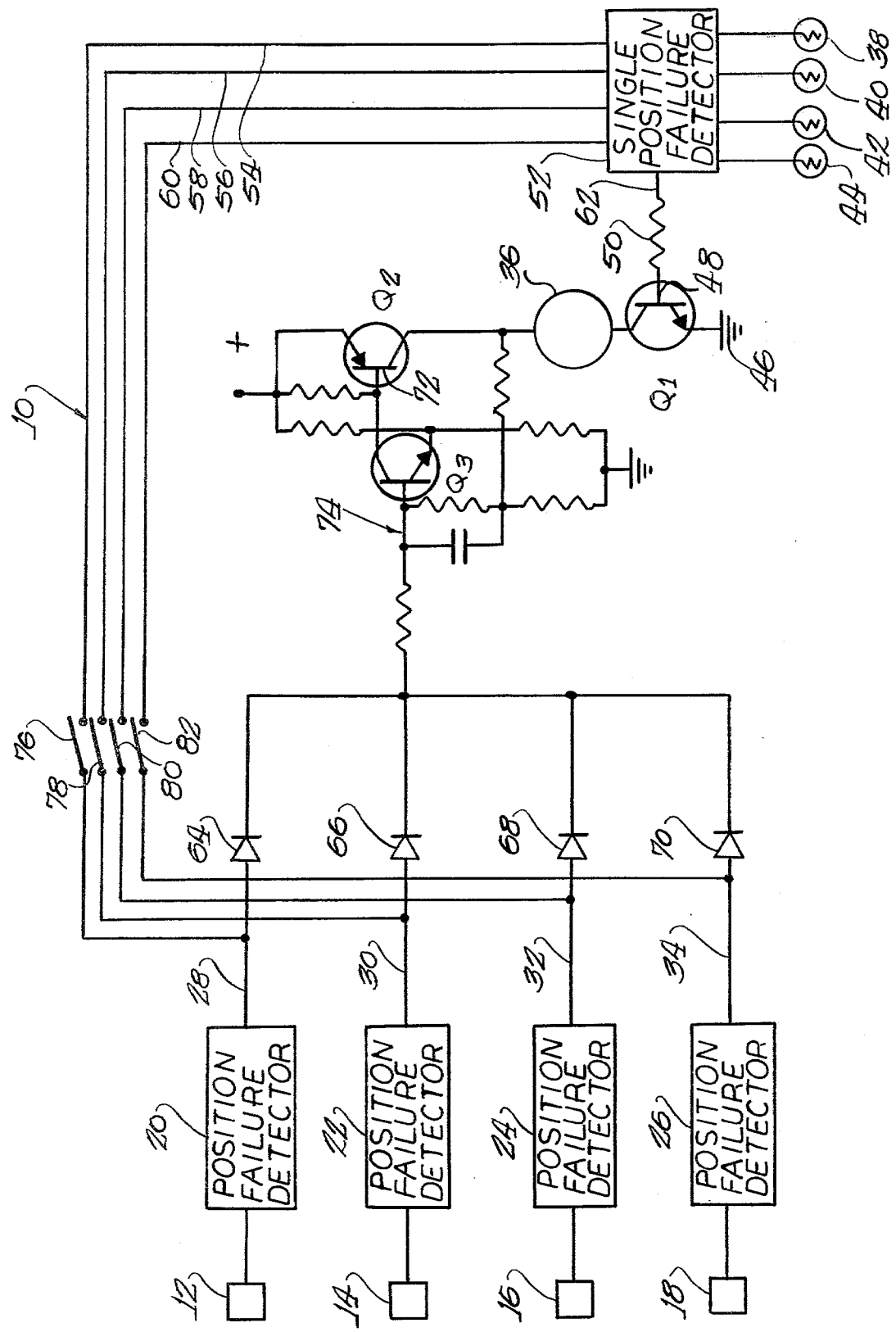

ELECTRONIC DISABLING SWITCH

BACKGROUND OF THE INVENTION

The present invention realtes to a novel monitoring system for monitoring the performance or function of a plurality of parts or stations in various machines and providing an alarm in the event of a failure or significant deviation in the operation of the machine.

While monitoring systems incorporating features of the present invention may be adapted for use in association with many different machines or processes, the invention is particularly suitable for incorporation in monitoring systems heretofore proposed for use in agriculture machines such as planters and combines. By way of example only, reference is made to U.S. Pat. No. 3,723,989, which shows a planter monitoring system capable of individually sensing the passage of seed through a plurality of seed planting chutes in a conventional multiple row planter and of providing both a visual light signal and an audible signal in the event there is an interruption in the flow of the seeds through any one of the seed delivery chutes. As a further example, reference is made to U.S. Pat. No. 3,739,367, which discloses a monitoring system adaptable for monitoring the rotational speed of a plurality of shafts in a machine such as a combine and of providing both a visual light and audible alarm signal in the event one of the shafts stops or slows below a predetermined speed.

It has been found that during the normal operation of machines such as combines or planters, there are times when an operator desires to slow or discontinue temporarily a machine function being monitored without switching off the monitoring system. For example, during combine operations, when the grain tank of the combine becomes full, the operator needs to unload the grain. In order to accomplish the unloading operation, the operator manipulates the machine controls so that the monitored shafts are stopped while an auger or the like is activated for discharging the grain from the tank. With monitoring systems heretofore in use, the stopping of the monitored shafts causes the audible alarm signal to sound in the absence of the provision of some mechanical disconnect switch. The sound of the audible signal during the entire unloading procedure may be quite disturbing to the operator.

With heretofore proposed planter monitoring systems, when an operator slows down at the end of a row to turn the tractor and planter around for planting another row, the audible signal comes on and sounds during the slow-down and turn-around. Again, the audible alarm signals during this period can be quite distracting and disturbing to an operator.

SUMMARY OF THE INVENTION

In view of the foregoing, it is an object of the present invention to provide a novel monitoring system which is capable of automatically temporarily disabling an audible alarm device incorporated therein in the event of intentional operator directed deviations or slowing of the monitored functions of the machine which frequently occur during actual operations of the machine in the field.

It has been found in the case of planters and combines that, as a practical matter, the possibility of simultaneous or near simultaneous failure or unacceptable deviation in the functions being monitored as a result of breakage or other malfunction is sufficiently remote that it can be disregarded. With heretofore proposed equipment, what the monitoring system actually sees when a combine operator stops the machine to unload the grain or the planter operator slows down and turns the planter around, is the simultaneous failure of all of the functions being monitored and the alarm is sounded. It is a further specific object of the present invention to provide a novel monitoring system for a plurality of machine functions capable of sounding an alarm in the event of a failure or deviation in one or more of the functions and further capable of sensing the simultaneous, or near simultaneous, failure of all of the monitored functions and providing a signal for temporarily disabling the alarm device.

A further more specific object of the present invention is to provide a novel monitoring system of the above described type with simple and ecconomical electronic means for automatically temporarily disabling an alarm device in response to the simultaneous, or near simultaneous, failure of all of the monitored functions and for further automatically reinstating the alarm device when one or more of the monitored functions again achieves the desired value.

Still another specific object of the present invention is to provide a novel monitoring system of the above-described type which is constructed for automatically disabling the alarm device in response to simultaneous, or near simultaneous, failure of all of the monitored functions after a short time delay for enabling the alarm device to provide a short alarm signal indicating the change in the operational function of the machine.

Objects and advantages of the present invention will become apparent from the following description and the accompanying drawing.

BRIEF DESCRIPTION OF THE DRAWING

The single FIGURE of the drawing is a block diagram showing a monitoring system incorporating features of the present invention.

Referring now more specifically to the drawing, a monitoring system 10, is shown which is adapted to be installed in a machine or apparatus for monitoring four different machine functions. It is to be understood, however, that the system may be modified for monitoring any desired smaller or larger number of a plurality of machine functions. In any event, the system is provided with a plurality of sensors respectively adapted to be associated with each separate machine function or operation to be monitored.

In the embodiment shown, the monitoring system includes sensors 12, 14, 16, and 18. If, for example, the monitoring system is to be installed in a combine, to monitor the rotation of different shafts, each of the sensors may include an arrangement comprising a Reed switch and a cooperating magnet on an associated shaft as shown in the aforementioned U.S. Pat. No. 3,739,367. Any other known device may be used for providing an output signal in accordance with the speed of rotation of a shaft. In the event the monitoring system is to be installed in a planter, each of the sensors may include a structure such as that shown in the aforementioned U.S. Pat. No. 3,723,989, for providing a signal in response to the passage of seed being planted.

Each of the sensors is connected with circuit means indicated by the blocks 20, 22, 24 and 26, respectively for providing a signal in the event the machine function being monitored deviates more than a predetermined amount from a predetermined value. For example, if the rotation of combine shaft is being monitored, each position failure detector may include circuitry such as that disclosed in U.S. Pat. No. 3,739,367, for providing a signal when the shaft stops or its rotation falls below a predetermined speed. If the system is in a planter monitor, each position failure detector may include circuitry such as that shown in U.S. Pat. No. 3,723,989, for providing a signal when the flow of seed being planted is stopped or falls below a predetermined rate.

The position failure detector means 20–26, respectively have outputs 28, 30, 32 and 34, which, in the embodiment shown, have a plus value when the machine function being monitored is normal or at least above a predetermined desired value. The signals at the outputs 28–34 respectively drop to zero when the machine function associated therewith fails or deviates from its normal value more than a predetermined amount.

In order to provide an operator with a warning of the malfunction or failure of one of the machine functions being monitored, the system includes an audible alarm device 36. The system may also include visual indicator lamps 38, 40, 42 and 44 respectively associated with the monitored functions. As previously indicated, during normal operation or machines, such as planters and combines, there are times when the machine is temporarily stopped or slowed down by an operator. At such times, it appears to the monitoring system that all of the functions being checked have failed and therefore, the system operates to turn on the audible alarm 36 and the visual alarm or signal devices 38–44. In accordance with a feature of the present invention, the monitoring system is constructed so that when all of the sensors 12–18 indicate a failure, the audible alarm device 36 is automatically and temporarily disable. Such disabling may be accomplished immediately, or as shown in the preferred embodiment, disclosed herein, after a short time delay which, for example, may be on the order of two to five seconds. Such a short operation of the audible alarm gives an operator an immediate indication of the condition of the functions being monitored without continuing so as to disturb or distract the operator. If desired, the system may be modified so as to disable the visual indicators or lamps 38–44 in the same manner as the audible alarm, but in most instances, the continued operation of the visual indicators during stopping or slowing of the machine is preferred.

In order to actuate the alarm or signal device in the manner previously described, the monitoring system includes circuit means comprising an NPN transistor $Q_1$ and another PNP transistor $Q_2$ connected with the alarm device 36 and ground 46. The base 48 of the transistor $Q_1$ is connected through resistor 50 with means 52 indicated on the drawing as a single position failure detector. This means is, in turn, connected by leads 54, 56, 58 and 60 with the outputs 28–34 of the position failure detectors. As previously indicated, the outputs 28–34 provide a positive signal when the machine functions are normal and a zero signal which indicates a malfunction. The means 52 is such that when a malfunction signal is received from one or more of the outputs 28–34, the signal is inverted and a plus signal is provided at the output 62 of the means 52. When this occurs, the normally off transistor $Q_1$ is turned on. The means 52 may include a NOR gate associated with each of the inputs 54–60. In the embodiment shown, the means 52 also includes circuit means for selectively energizing the visual signal such, for example, as the lamps 38–44 in accordance with the signals respectively from the inputs 54–60.

The outputs 28–34 of the individual position failure detectors are also respectively connected through an OR gate which, in the embodiment shown, includes diodes 64, 66, 68 and 70 with the base 72 of the transistor $Q_2$. In the embodiment shown, $Q_2$ is also a part of a time delay network 74 including another NPN transistor $Q_3$. When the machine functions being monitored are normal, each of the position failure detector means 20–26 provide a positive signal transmitted through its associated OR gate to the base of the transistor $Q_2$ so that this transistor is normally turned on. Thus, during normal operation of the machine, the transistor $Q_2$ is on, but the transistor $Q_1$ is off so that no alarm is sounded.

In the event one of the sensors observes a failure or deviation in the machine function being monitored, a failure signal will be sent to the means 52 which provides a signal to the transistor base 48 turning on transistor $Q_1$. Since the transistor $Q_2$ is already on, the alarm 36 sounds. For example, if the sensor 12 observes a failure, the plus signal at output 28 will drop to zero and this change is transmitted to the means 52 which, in turn, provides a plus signal to the transistor means 48. At the same time, the plus signal from any one or all of the outputs 30, 32 and 34 maintains the transistor $Q_2$ in the on condition so that the alarm will sound. The same result will be achieved if others of the sensors observe a failure as long as one of the sensors continues to indicate satisfactory operation of the function it is monitoring.

In the event all of the sensors 12–18 observe and indicate a failure, the plus bias on the base 72 of the transistor $Q_2$ will be discontinued so that the transistor $Q_2$ will be turned off and the alarm disabled. This disabling of the alarm is accomplished automatically and may be accomplished substantially instantaneously. However, in the preferred embodiment, a time delay network 74 is connected between the OR gate 64–70 and the transistor base 72. This time delay network functions so that when all of the plus signals from the outputs 28, 30, 32 and 34 are discontinued, the plus bias on the transistor base 72 will be maintained for a short period of time which might, for example, be about two to five seconds. This provides an operator with a short audible signal indicating that the functions being monitored have changed and then the alarm is turned off.

Occasions arise when it may be desired to operate the machine even though one of the sensors, or the machine function associated therewith, is disabled. For example one of the sensors 12–18 might be broken so as to require replacement, but it is necessary to operate the machine while waiting to obtain a replacement part. In order effectively to remove a portion of the circuit means having such a broken or disabled monitor from the operation of the overall system, normally closed disengage switches 76, 78, 80 and 82 are connected to the circuit between the outputs 28–34 and the means 52.

While a preferred embodiment has been shown and described herein, it is obvious that many details may be changed without departing from the spirit and scope of the appended claims.

The invention is claimed as follows:

1. A monitoring system for an apparatus having a plurality of functions to be monitored, comprising a plurality of sensors respectively disposed for sensing said plurality of functions and providing a signal in accordance with each of said functions, an alarm device, circuit means responsive to each of said sensors and connected to said alarm device for actuating the alarm device in the event of an unacceptable deviation of any one or more of said functions from a predetermined value, and electronic means connected in said circuit means for automatically disabling said alarm device in response to said signals simultaneously from all of said sensors indicating said deviation in all of said functions.

2. A monitoring system according to claim 1, wherein said circuit means includes time delay means for delaying said disabling of the alarm device a short time period after all of said sensors indicate said predetermined deviation of all of said functions.

3. A monitoring system, according to claim 1, wherein said electronic means comprises first and second transistors connected with said alarm device for energizing the alarm device when both of said transistors are on, said circuit means including means normally maintaining said first transistor off and said second transistor on when all of said sensors indicate normal operations of the functions being monitored, said circuit means further including means for turning said first transistor on when one or more of said sensors indicates said deviation of the function being monitored and for turning said second transistor off when all of said sensors indicate said deviation of the function being monitored.

4. A monitoring system, according to claim 3, wherein said alarm device is an audible alarm device, said system further including a plurality of visual signal devices respectively corresponding to each of said sensors, and said circuit means including means for selectively actuating each of said visual signal devices in accordance with the signal provided by an associated sensor.

5. A monitoring system acccording to claim 1, wherein said circuit means includes a plurality of position failure detector means respectively associated with each of said sensors for providing a plus output when their associated sensors indicate normal operation of the functions being monitored and a zero output when their associated sensors indicate said deviation of the function, said electronic means comprising first and second transistors connected with the alarm device for actuating the alarm device when both transistors are on, means connected with said outputs of said position failure detector means and the base of said first transistor for normally maintaining said first transistor off and for turning said first transistor on in response to a change of any of said outputs from plus to zero, and OR gate means connecting said outputs with the base of said second transistor for normally maintaining said second transistor on and for turning said second transistor off when all of said outputs simultaneously indicate a change from plus to zero.

* * * * *